(12) United States Patent
Nandi et al.

(10) Patent No.: US 9,351,219 B1
(45) Date of Patent: May 24, 2016

(54) APPARATUS, SYSTEM, AND METHOD FOR PREDICTING ROAMING PATTERNS OF MOBILE DEVICES WITHIN WIRELESS NETWORKS

(71) Applicant: Juniper Networks, Inc., Sunnyvale, CA (US)

(72) Inventors: Sudipto Nandi, Bangalore (IN); Anu Joykutty Varughese, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 14/664,811

(22) Filed: Mar. 21, 2015

(51) Int. Cl.
*H04W 4/00* (2009.01)
*H04W 36/24* (2009.01)
*H04W 36/08* (2009.01)
*H04W 8/02* (2009.01)

(52) U.S. Cl.
CPC .............. *H04W 36/245* (2013.01); *H04W 8/02* (2013.01); *H04W 36/08* (2013.01)

(58) Field of Classification Search
CPC .................................................... H04W 36/245
USPC .................................................... 455/432.1
See application file for complete search history.

(56) References Cited

U.S. PATENT DOCUMENTS

| 6,745,032 | B1 * | 6/2004 | Alvesalo | H04W 36/10 455/432.1 |
|---|---|---|---|---|
| 8,644,818 | B1 * | 2/2014 | Okmyanskiy | H04W 64/003 370/331 |
| 2008/0076413 | A1 * | 3/2008 | Jones | H04L 63/0892 455/432.3 |
| 2011/0143667 | A1 * | 6/2011 | Cugnini | H04N 21/6131 455/41.2 |
| 2012/0144462 | A1 * | 6/2012 | Pochop, Jr. | H04L 63/062 726/6 |
| 2013/0117121 | A1 * | 5/2013 | Raman | G06Q 30/0261 705/14.58 |
| 2013/0150012 | A1 * | 6/2013 | Chhabra | H04W 48/16 455/418 |
| 2015/0181408 | A1 * | 6/2015 | Ankaiah | H04W 36/32 370/338 |

OTHER PUBLICATIONS

"What is PMK Caching, and how is it different from either Opportunistic Key Caching (OKC), or CCKM?", http://intermec.custhelp.com/app/answers/detail/a_id/13488/~/what-is-pmk-caching,-and-how-is-it-different-from-either-opportunistic-key, as accessed Feb. 12, 2015, Honeywell International, Inc., Intermec, (Jul. 22, 2011).

* cited by examiner

*Primary Examiner* — Santiago Garcia
(74) *Attorney, Agent, or Firm* — ALG Intellectual Property, LLC

(57) ABSTRACT

The disclosed apparatus may include (1) a storage device that maintains information about mobile devices roaming within a wireless network, (2) an AP-prediction unit that (A) determines, based at least in part on the information maintained in the storage device, a number of times that a mobile device has visited a specific AP within the wireless network, (C) generates, based at least in part on the number of times, a score that represents a probability that the specific AP is the next AP visited by the mobile device, and then (D) determines that the score is above a certain threshold, and (3) a profile-distribution unit that provides, in response to the determination that the score is above the certain threshold, the specific AP with a roaming-session profile that facilitates transferring a roaming session of the mobile device to the specific AP. Various other apparatuses, systems, and methods are also disclosed.

16 Claims, 7 Drawing Sheets

Information
104

| MAC ADDRESS OF MOBILE DEVICE: | INFORMATION ABOUT MOBILE DEVICE: |
|---|---|
| 32:58:42:61:9C:A2 | Information 300 |
| 22:F1:A3:93:F4:2E | Information 302 |
| B7:43:33:1A:45:37 | Information 304 |
| 64:AB:FF:18:C4:01 | Information 306 |
| 05:F9:A6:33:FA:21 | Information 308 |

*FIG. 3*

APPARATUS, SYSTEM, AND METHOD FOR PREDICTING ROAMING PATTERNS OF MOBILE DEVICES WITHIN WIRELESS NETWORKS

BACKGROUND

Mobile devices often roam among various Access Points (APs) within a wireless network. For example, a wireless network may include 20 APs that facilitate connections between mobile devices and the wireless network. In this example, a mobile device may visit areas covered by 18 of those 20 APs over a 1-hour period of time. In doing so, the mobile device may establish and/or maintain a network session with the wireless network by way of the 18 different APs visited over that 1-hour period of time.

In some scenarios, each of the APs visited by the mobile device may need to obtain a profile and/or context for the mobile device prior to facilitating a transfer of the mobile device's network session from the last visited AP. The APs may be able to obtain the mobile device's profile and/or context using one or more conventional approaches. Unfortunately, these conventional approaches may have deficiencies that lead to certain problems (such as high resource consumption, unreliability, and/or delays) within the wireless network.

For example, in one conventional approach, a wireless network may be configured to pre-cache each mobile device's profile and/or context in each of the APs within the wireless network. Unfortunately, this conventional approach may lead to unnecessarily high memory consumption and/or processing power usage in the APs.

In another conventional approach, a wireless network may be configured such that a newly visited AP requests the mobile device's profile and/or context from the last visited AP. Unfortunately, this conventional approach may introduce certain delays into the transfer of the mobile device's profile and/or context from one AP to the other, potentially resulting in connection loss and/or the need for re-authentication.

In a further conventional approach, a wireless network may be configured to pre-cache each mobile device's profile and/or context in those APs neighboring the current AP (using, e.g., Radio Resource Management (RRM)). Unfortunately, this conventional approach may require complex, expensive, and/or specialized management tools and/or wireless architectures. Additionally or alternatively, this conventional approach may fail to take into account whether the mobile devices are even likely to visit certain neighboring APs. This conventional approach may also be somewhat ineffective in the event that the wireless network includes signal coverage holes.

The instant disclosure, therefore, identifies and addresses a need for apparatuses, systems, and methods for predicting roaming patterns of mobile devices within wireless networks.

SUMMARY

As will be described in greater detail below, the instant disclosure generally relates to apparatuses, systems, and methods for predicting roaming patterns of mobile devices within wireless networks. In one example, an apparatus for accomplishing such a task may include a storage device that maintains information about mobile devices roaming within a wireless network. The apparatus may also include an AP-prediction unit communicatively coupled to the storage device. The AP-prediction unit may (1) identify at least one of the mobile devices roaming within the wireless network, (2) determine, based at least in part on the information maintained in the storage device, a number of times that the mobile device has visited a specific AP within the wireless network, (3) generate, based at least in part on the number of times that the mobile device has visited the specific AP, a score that represents a probability that the specific AP is the next AP visited by the mobile device, and then (4) determine that the score is above a certain threshold. The apparatus may further include a profile-distribution unit communicatively coupled to the AP-prediction unit. The profile-distribution unit may provide, in response to the determination that the score is above the certain threshold, the specific AP with a roaming-session profile that facilitates transferring a roaming session of the mobile device to the specific AP in anticipation of the specific AP being the next AP visited by the mobile device while roaming within the wireless network.

Similarly, a network device incorporating the above-described apparatus may include a hash table that includes information about mobile devices roaming within a wireless network. The network device may also include an AP-prediction unit that (1) identifies at least one of the mobile devices roaming within the wireless network, (2) determines, based at least in part on the information maintained in the storage device, a number of times that the mobile device has visited a specific AP within the wireless network, (3) generates, based at least in part on the number of times that the mobile device has visited the specific AP, a score that represents a probability that the specific AP is the next AP visited by the mobile device, and then (4) determines that the score is above a certain threshold. The network device may further include a profile-distribution unit that provides, in response to the determination that the score is above the certain threshold, the specific AP with a roaming-session profile that facilitates transferring a network connection of the mobile device to the specific AP in anticipation of the specific AP being the next AP visited by the mobile device while roaming within the wireless network.

A corresponding method may include (1) identifying at least one mobile device roaming within a wireless network, (2) determining a number of times that the mobile device has visited a specific AP within the wireless network, (3) generating, based at least in part on the number of times that the mobile device has visited the specific AP, a score that represents a probability that the specific AP is the next AP visited by the mobile device, (4) determining that the score is above a certain threshold, and then in response to the determination that the score is above the certain threshold, (5) providing the specific AP with a roaming-session profile that facilitates transferring a network connection of the mobile device to the specific AP in anticipation of the specific AP being the next AP visited by the mobile device while roaming within the wireless network.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 3 is a block diagram of an exemplary network incorporated into an implementation for predicting roaming patterns of mobile devices within the network.

Figure 1:
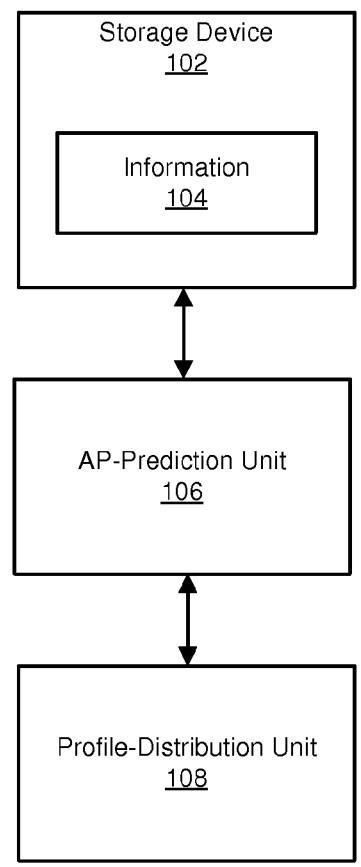
FIG. 1 is a block diagram of an exemplary apparatus for predicting roaming patterns of mobile devices within wireless networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for predicting roaming patterns of mobile devices within wireless networks. As will be explained in greater detail below, by monitoring and/or tracking the number of times that a mobile device has visited certain APs within a wireless network, embodiments of the instant disclosure may be able to generate a historical representation of the mobile device's roaming pattern within the wireless network. In addition, embodiments of the instant disclosure may be able to predict, based at least in part on the historical representation of the mobile device's roaming pattern, which of the APs the mobile device will visit next. The APs that the mobile device is likely to visit next may sometimes be referred to collectively as the "profile neighborhood" or "context neighborhood." Embodiments of the instant disclosure may then provide each AP within the profile neighborhood with a roaming-session profile that facilitates transferring the mobile device's roaming session to any AP within the profile neighborhood.

When the mobile device first connects to the wireless network and has yet to establish a history of roaming within the wireless network, embodiments of the instant disclosure may set an initial profile neighborhood for the mobile device that consists of the APs neighboring and/or surrounding the AP first visited by the mobile device. As the mobile device begins roaming within the wireless network, embodiments of the instant disclosure may modify the initial profile neighborhood to reflect the mobile device's historical roaming pattern instead of merely the APs neighboring and/or surrounding the AP currently hosting the mobile device.

By predicting which APs will be visited next by the mobile device and then providing each AP within the profile neighborhood with a roaming-session profile that facilitates transferring the mobile device's roaming session to any AP within the profile neighborhood, embodiments of the instant disclosure may be able to (1) reduce the amount of memory consumed and/or processing power used by the APs within the wireless network, (2) reduce the amount of delay involved in transferring the mobile device's roaming session from one AP to another, (3) decrease the likelihood of connection loss resulting from transferring the mobile device's roaming session from one AP to another, (4) mitigate the need for re-authentication in connection with transferring the mobile device's roaming session from one AP to another, and/or (5) reduce network overhead and/or maintenance costs.

The following will provide, with reference to FIG. 1, examples of apparatuses that predict roaming patterns of mobile devices within wireless networks. The discussion corresponding to FIG. 2 will provide a detailed description of exemplary implementations of an apparatus that predicts roaming patterns of mobile devices within wireless networks. The discussion corresponding to FIG. 3 will provide a detailed description of an exemplary network incorporated into an implementation for predicting roaming patterns of mobile devices within the network. The discussion corresponding to FIGS. 4 and 5 will provide a detailed description of exemplary information about mobile devices roaming within wireless networks. The discussion corresponding to FIG. 6 will provide a detailed description of an exemplary method for predicting roaming patterns of mobile devices within wireless networks. Finally, the discussion corresponding to FIG. 7 will provide numerous examples of systems that may include the apparatus shown in FIG. 1.

FIG. 1 shows a block diagram of an exemplary apparatus 100 for predicting roaming patterns of mobile devices within wireless networks. The term "roaming pattern," as used herein, generally refers to any pattern or sequence of APs visited by a mobile device within a wireless network. By predicting the roaming patterns of mobile devices within a wireless network, apparatus 100 may be able to predict which APs within the wireless network will be visited next by the mobile devices.

As illustrated in FIG. 1, apparatus 100 may include an AP-prediction unit 106 communicatively coupled to a storage device 102. The term "AP-prediction unit," as used herein, generally refers to any type, form, or portion of physical hardware, circuit, device, and/or processor that performs certain Input/Output (I/O) operations and/or computing tasks directed to predicting roaming patterns of mobile devices within wireless networks. In one example, AP-prediction unit 106 may represent an integrated circuit whose configuration and/or infrastructure is at least partially fixed. Additionally or alternatively, AP-prediction unit 106 may represent an integrated circuit whose configuration and/or infrastructure is at least partially variable and/or programmable. Examples of AP-prediction unit 106 include, without limitation, Field-Programmable Gate Arrays (FPGAs), Central Processing Units (CPUs), processors, microprocessors, microcontrollers, Application-Specific Integrated Circuits (ASICs), software modules installed on one or more of the same, portions of one or more of the same, variations of one or more of the same, combinations of one or more of the same, or any other suitable AP-prediction unit.

In some examples, storage device 102 may include information 104 about mobile devices roaming within a wireless network. In one example, information 104 may be arranged and/or stored in a table (such as a hash table) within storage device 102. In this example, information 104 may be indexed by Media Access Control (MAC) addresses that each correspond to a different mobile device roaming with the wireless network. Examples of storage device 102 include, without limitation, random-access memory devices, read-only memory devices, solid-state drives, flash drives, disk drives, portions of one or more of the same, variations of one or more of the same, combinations of one or more of the same, or any other suitable storage device.

As illustrated in FIG. 1, apparatus 100 may also include a profile-distribution unit 108 communicatively coupled to AP-prediction unit 106. The term "profile-distribution unit," as used herein, generally refers to any type, form, or portion of physical hardware, circuit, device, and/or processor that performs certain Input/Output (I/O) operations and/or computing tasks directed to distributing roaming-session profiles for mobile devices to APs within a wireless network. In one example, profile-distribution unit 108 may represent an integrated circuit whose configuration and/or infrastructure is at least partially fixed. Additionally or alternatively, profile-distribution unit 108 may represent an integrated circuit whose configuration and/or infrastructure is at least partially variable and/or programmable. Examples of profile-distribution unit 108 include, without limitation, FPGAs, CPUs, processors, microprocessors, microcontrollers, ASICs, software modules installed on one or more of the same, portions of one or more of the same, variations of one or more of the same, combinations of one or more of the same, or any other suitable profile-distribution unit.

In some examples, apparatus 100 may include and/or represent all or a portion of a wireless Local Area Network (LAN) controller that manages APs within a wireless network. Additionally or alternatively, apparatus 100 may include and/or represent all or a portion of a master AP that has been designated and/or assigned to manage other APs within a wireless network.

In one example, AP-prediction unit 106 may identify a mobile device roaming within a wireless network. In this example, AP-prediction unit 106 may determine the number of times that the mobile device has visited a specific AP within the wireless network. AP-prediction unit 106 may arrive at this determination based at least in part on information 104 stored in storage device 102.

In one example, AP-prediction unit 106 may generate a score based at least in part on the number of times that the mobile device has visited the specific AP. In this example, the score may represent the probability that the specific AP is the next AP visited by the mobile device. Upon generating this score, AP-prediction unit 106 may determine that the score is above a certain threshold. In response to the determination that the score is above that threshold, profile-distribution unit 108 may provide the specific AP with a roaming-session profile that facilitates transferring a roaming session of the mobile device to the specific AP. By providing the specific AP with the roaming-session profile in this way, profile-distribution unit 108 may ensure that the specific AP is able to seamlessly take over the mobile device's roaming session in the event that the specific AP is the next AP visited by the mobile device while roaming within the wireless network.

Figure 2:
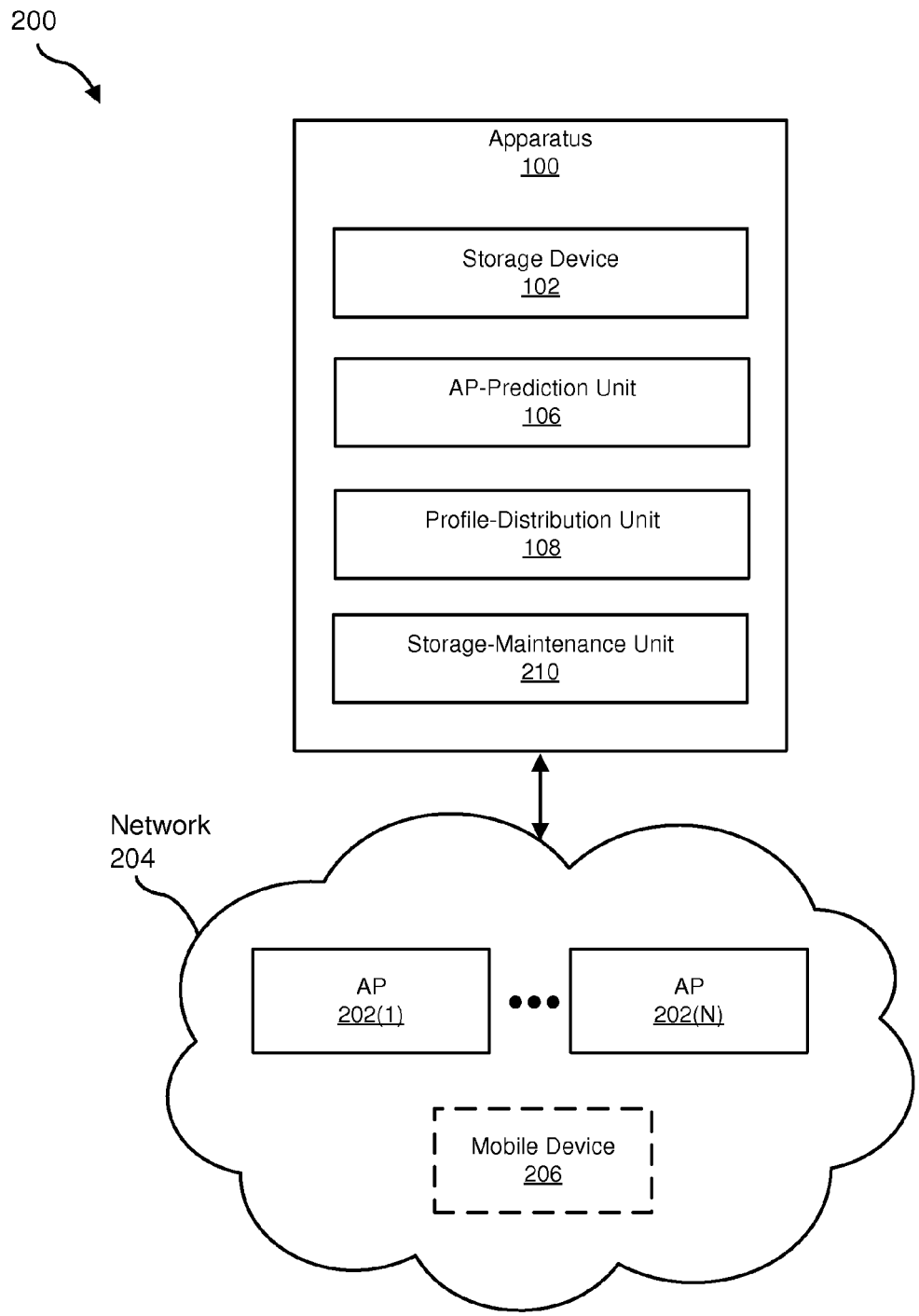
FIG. 2 is a block diagram of an exemplary implementation of an apparatus for predicting roaming patterns of mobile devices within wireless networks.

FIG. 2 shows a block diagram of an exemplary implementation 200 of apparatus 100 for predicting roaming patterns of mobile devices within wireless networks. As illustrated in FIG. 2, implementation 200 may include apparatus 100 in communication with one or more of APs 202(1)-(N) via a network 204. Implementation 200 may also include a mobile device 206 that is roaming within network 204. Although illustrated as separate entities in FIG. 2, apparatus 100, APs 202(1)-(N), and mobile device 206 may all represent and/or be considered portions of network 204. Additionally or alternatively, apparatus 100 and APs 202(1)-(N) may all represent and/or be considered portions of the infrastructure and/or architecture of network 204 to which mobile device 206 is connected.

The term "network," as used herein, generally refers to any type or form of medium and/or architecture that facilitates communication or data transfer. Examples of network 204 include, without limitation, an intranet, a Wide Area Network (WAN), a LAN, a wireless LAN, a Personal Area Network (PAN), the Internet, a Power Line Communications (PLC) network, a cellular network (e.g., a Global System for Mobile Communications (GSM) network), portions of one or more of the same, variations of one or more of the same, combinations of one or more of the same, or any other suitable network. Network 204 may facilitate communication or data transfer using wireless and/or wired connections.

The term "access point" and the abbreviation "AP," as used herein, generally refer to any type or form of computing device that facilitates wireless connections between mobile devices and a network. In one example, APs 202(1)-(N) may be positioned and/or arranged throughout a physical location and/or structure to enable mobile devices to access network 204 while roaming around the physical location and/or structure. As the mobile devices roam around the physical location and/or structure, the mobile devices may visit various APs included in APs 202(1)-(N). In other words, the mobile devices may establish a connection to the network through one or more of those APs. Additionally or alternatively, the APs may transfer the mobile devices' roaming sessions from one to another as the mobile devices roam throughout the physical location and/or structure.

Each of APs 202(1)-(N) may emit a signal and/or radiation that reaches and/or covers an area of the physical location and/or structure. As mobile device 206 roams within network 204, mobile device 206 may move out of an area covered by the signal and/or radiation of one of APs 202(1)-(N) and into an area covered by the signal and/or radiation of another one of APs 202(1)-(N). As a result, these APs may essentially pass and/or transfer the roaming session of mobile device 206 from the one to the other such that the connection between mobile device 206 and network 204 goes uninterrupted.

The term "mobile device," as used herein, generally refers to any type or form of computing device capable of reading computer-executable instructions and/or being carried by a user. Examples of mobile device 206 include, without limitation, cellular phones, laptops, tablets, Personal Digital Assistants (PDAs), multimedia players, embedded systems, wearable devices (e.g., smart watches, smart glasses, etc.), gaming consoles, variations of one or more of the same, combinations of one or more of the same, or any other suitable mobile device.

As illustrated in FIG. 2, apparatus 100 may also include a storage-maintenance unit 210 communicatively coupled to storage device 102. The term "storage-maintenance unit," as used herein, generally refers to any type, form, or portion of physical hardware, circuit, device, and/or processor that performs certain Input/Output (I/O) operations and/or computing tasks directed to maintaining information about mobile devices roaming within a wireless network. In one example, storage-maintenance unit 210 may represent an integrated circuit whose configuration and/or infrastructure is at least partially fixed. Additionally or alternatively, storage-maintenance unit 210 may represent an integrated circuit whose configuration and/or infrastructure is at least partially variable and/or programmable.

Examples of storage-maintenance unit 210 include, without limitation, FPGAs, CPUs, processors, microprocessors, microcontrollers, ASICs, software modules installed on one or more of the same, portions of one or more of the same, variations of one or more of the same, combinations of one or more of the same, or any other suitable storage-maintenance unit. Although illustrated as separate entities in FIG. 2, AP-prediction unit 106, profile-distribution unit 108, and storage-maintenance unit 210 may alternatively represent portions of a single unit that predicts roaming patterns of mobile devices within wireless networks.

In one example, storage-maintenance unit 210 may construct a table that includes information 104 about the mobile devices roaming within network 204. For example, storage-maintenance unit 210 may organize information 104 into a hash table stored in storage device 102. Additionally or alternatively, storage-maintenance unit 210 may index information 104 included in the hash table by the MAC addresses of the mobile devices roaming within network 204.

As a specific example, storage-maintenance unit 210 may organize information 104 into a table shown in FIG. 3. By organizing information 104 in this way, storage-maintenance unit 210 may ensure that information 104 in FIG. 3 is easily accessible and/or searchable. As illustrated in FIG. 3, information 104 may identify the MAC addresses of various mobile devices roaming within network 204 (in this example, "32:58:42:61:9C:A2," "22:F1:A3:93:F4:2E," "B7:43:33:1A: 45:37," "64:AB:FF:18:C4:01," and "05:F9:A6:33:FA:21") and corresponding information about those mobile devices (in this example, "Information 300," "Information 302," "Information 304," "Information 306," and "Information 308," respectively).

Continuing with this example, each of information 300, information 302, information 304, information 306, and information 308 may identify one or more APs that the mobile devices represented by MAC addresses "32:58:42:61:9C:A2," "22:F1:A3:93:F4:2E," "B7:43:33:1A: 45:37," "64:AB:FF:18:C4:01," and "05:F9:A6:33:FA:21," respectively, are likely to visit next. For example, information 304 in FIG. 4 may identify 4 different APs previously visited by the mobile device with MAC address "B7:43:33:1A:45: 37." In this example, each AP identified in information 304 may have been assigned a score that represents the probability that the mobile device with MAC address "B7:43:33:1A:45: 37" will visit that AP next. Moreover, each of the scores assigned to the APs identified in information 304 may be above a certain threshold, meaning that the mobile device with MAC address "B7:43:33:1A:45:37" is likely to visit one of these APs next (as opposed to visiting one of the other APs next) while roaming within network 204.

Figure 4:
FIG. 4 is an illustration of exemplary information about mobile devices roaming within a wireless network.

As illustrated in FIG. 4, information 304 may identify the MAC addresses of the 4 different APs most likely to be visited next by the mobile device with MAC address "B7:43:33:1A: 45:37" (in this example, "3C:42:5C:06:24:1A," "E2:BA:24: 19:6B:54," "16:7B:A5:43:71:3B," and "45:BA:41:FC:29: B1"), the number of times that the mobile device with MAC address "B7:43:33:1A:45:37" has visited those 4 different APs (in this example, "4," "5," "7," and "4," respectively), the scores assigned to those 4 different APs (in this example, "65," "85," "80," and "70," respectively), and aging timers that indicate the amount of time that has passed since the mobile device with MAC address "B7:43:33:1A:45:37" last visited those 4 different APs (in this example, "41:30," "01: 30," "57:04," and "31:28," respectively, where the aging timer is formatted in [minutes]:[seconds]).

In one example, AP-prediction unit 106 may identify mobile device 206 roaming within network 204. For example, AP-prediction unit 106 may detect mobile device 206 moving within a physical location and/or structure covered by network 204. Additionally or alternatively, AP-prediction unit 106 may identify mobile device 206 as being connected to network 204 by way of AP 202(1).

In one example, AP-prediction unit 106 may determine the number of times that mobile device 206 has visited and/or associated with a specific AP within network 204. For example, AP-prediction unit 106 may access information 104. AP-prediction unit 106 may then determine that mobile device 206 has visited and/or associated with AP 202(N) more than 10 times. In other words, AP-prediction unit 106 may determine that mobile device 206 has established and/or maintained a network connection through AP 202(N) on more than 10 different occasions.

Upon determining the number of times that mobile device 206 has visited and/or associated with the specific AP, AP-prediction unit 106 may generate a score that represents the probability that the specific AP is the next AP visited by mobile device 206. AP-prediction unit 106 may apply any of a variety of different algorithms to generate the score. For example, AP-prediction unit 106 may generate a score for AP 202(N) using this formula:

$$\text{score} = \begin{cases} 1 - e^{-x} \rightarrow \text{Addition Rate } (W_{ta}) \\ W_{x0} \times (e^{-t}) \rightarrow \text{Decay Rate } (W_{td}) \end{cases}.$$

In this example, "x" may represent the number of times that a mobile device has visited AP 202(N), "$W_{x0}$" may represent the value of the score when the mobile device last roamed away from AP 202(N), and "t" may represent the amount of time that has elapsed since the mobile device last roamed away from AP 202(N). Additionally or alternatively, AP-prediction unit 106 may configure information 104 to automatically generate and/or maintain a score for AP 202(N) based at least in part on that formula.

In some examples, apparatus 100 may maintain and/or keep track of various aging timers. Each of these aging timers may correspond to a different AP with respect to a specific mobile device. For example, one aging timer may correspond to AP 202(N) for mobile device 206. In this example, another aging timer may correspond to AP 202(N) for another mobile device (not necessarily illustrated in FIG. 2).

In some example, aging timers may run (or increase with time) only when the corresponding AP is not hosting the mobile device. For example, while mobile device 206 is visiting and/or associated with AP 202(N), the aging timer corresponding to AP 202(N) for mobile device 206 may remain stopped and/or reset. In contrast, while mobile device 206 is roaming elsewhere within network 204 and is not associated with AP 202(N), the aging timer corresponding to AP 202(N) for mobile device 206 may be running (or increasing with time).

In some examples, aging timers may stop and/or reset once the mobile device re-visits and/or re-associates with the corresponding AP. For example, when mobile device 206 re-visits and/or re-associates with AP 202(N), apparatus 100 may stop and/or reset the aging timer corresponding to AP 202(N) for mobile device 206. Accordingly, this aging timer may cause the corresponding score to decay and/or decrement only while mobile device 206 is not visiting and/or associating with AP 202(N).

Upon generating the score, AP-prediction unit 106 may determine that the score is above a certain threshold. For example, AP-prediction unit 106 may determine that the score for AP 202(N) is above a threshold value of "60." In one example, this threshold may be arbitrarily fixed at a specific value. In another example, this threshold may vary based at least in part on the scores for other APs relative to mobile device 206 (e.g., such that information 304 always identifies the 4 APs most likely to be visited next by mobile device 206).

In response to the determination that the score is above the threshold, profile-distribution unit 108 may provide AP 202(N) with a roaming-session profile that facilitates transferring the roaming session of mobile device 206 to AP 202(N). The term "roaming-session profile," as used herein, generally refers to any type or form of data, information, keys, and/or context that enables an AP to provide network access to a mobile device that has been authenticated previously by another AP. For example, in the event that AP 202(1) has previously authenticated mobile device 206, AP 202(N) may skip the authentication process for mobile device 206 based at least in part on the roaming-session profile. In this example, the authentication process may include and/or represent Institute of Electrical and Electronics Engineers (IEEE) 802.1X authentication.

In one example, profile-distribution unit 108 may provide AP 202(N) with the roaming-session profile by directing AP 202(1) to send an instance of the roaming-session profile to AP 202(N). Additionally or alternatively, profile-distribution unit 108 may provide AP 202(N) with the roaming-session profile by sending an instance of the roaming-session profile to AP 202(N) from apparatus 100.

In one example, the roaming-session profile may include one or more roaming keys, unique network keys, encryption keys, and/or other security parameters that indicate how to encode network traffic destined for mobile device 206 during the roaming session. For example, the roaming-session profile may include a Pairwise Master Key (PMK) used to encode network traffic destined for mobile device 206 during the roaming session. Additionally or alternatively, the roaming-session profile may include one or more multicast and/or broadcast keys. The roaming-session profile may also include one or more unicast and/or mapping keys.

In some examples, the size of the roaming-session profile may vary depending on the type of roaming session of mobile device 206 and/or the type(s) of services applied to the network traffic transferred to and/or from mobile device 206 during the roaming session. For example, network 204 may apply certain security services to network traffic originating from and/or destined for mobile device 206. In this example, the size of roaming-session profile may remain relatively small.

However, in another example, network 204 may apply Deep Packet Inspection (DPI) and/or firewall services to network traffic originating from and/or destined for mobile device 206. In this example, the size of roaming-session profile may become relatively large. As a result, to avoid reaching the scalability and/or resource limitations of the individual APs, network 204 may distribute the roaming-session profile for mobile device 206 to only those APs that are most likely to be visited next by mobile device 206. In other words, network 204 may distribute the roaming-session profile for mobile device 206 to only those APs whose scores with respect to mobile device 206 are above the threshold.

Figure 5:
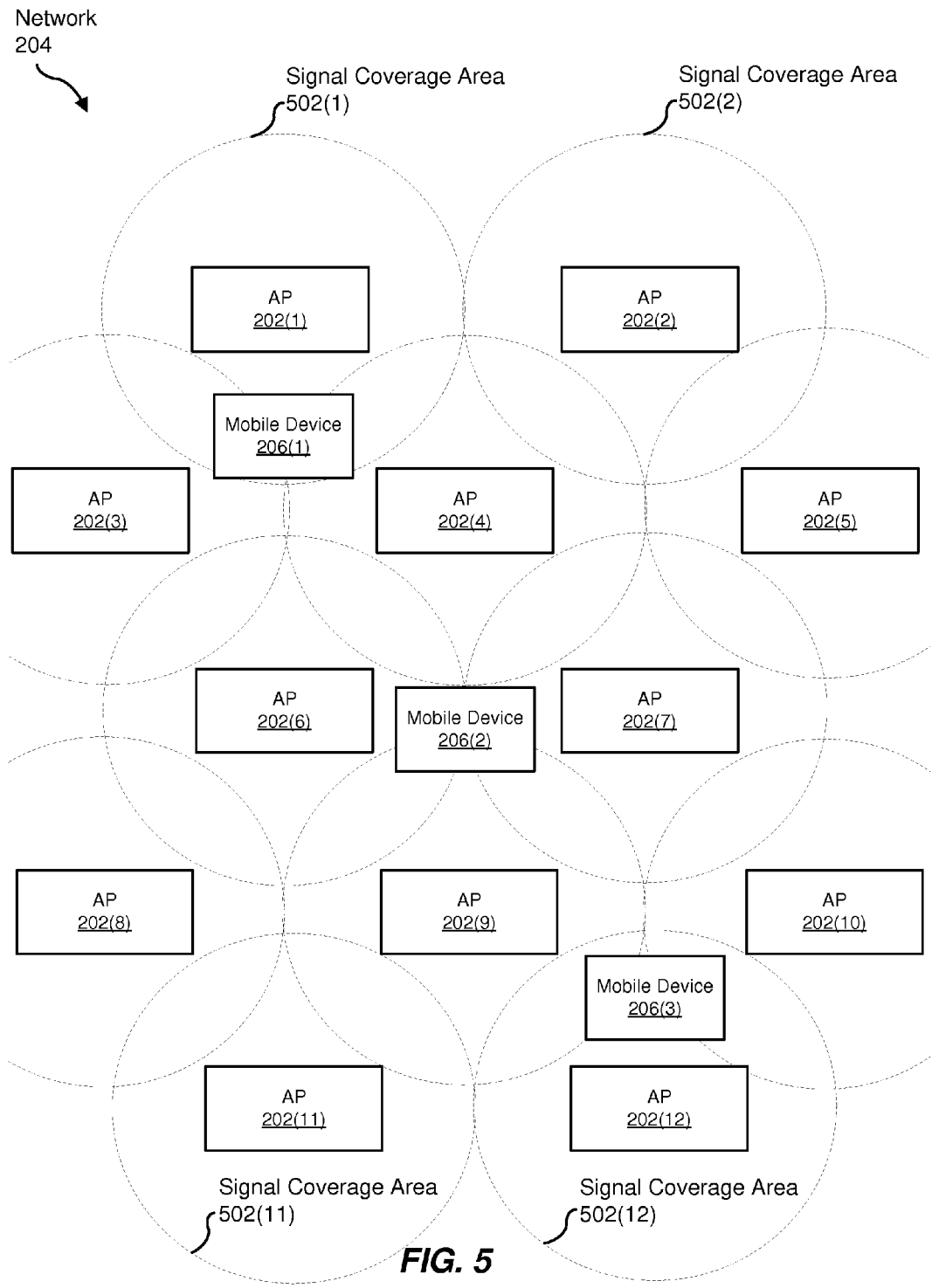
FIG. 5 is an illustration of additional exemplary information about mobile devices roaming within a wireless network.

As a specific example, network 204 in FIG. 5 may include APs 202(1)-202(12). As illustrated in FIG. 5, each of APs 202(1)-(12) may emit a signal and/or radiation that reaches and/or covers a certain area or space. For example, APs 202(1), 202(2), 202(11), and 202(12) may each emit a signal and/or radiation that reaches the perimeter represented by signal coverage areas 502(1), 502(2), 502(11), and 502(12), respectively, in FIG. 5.

As illustrated in FIG. 5, mobile devices 206(1)-(3) may be roaming around a physical location and/or structure covered by network 204. In an effort to distribute the respectively roaming-session profiles of mobile devices 206(1)-(3) to only those APs that are most likely to be visited next by mobile devices 206(1)-(3), apparatus 100 (not illustrated in FIG. 5) may maintain information 104 about mobile devices 206(1)-(3) in storage device 102. In addition, apparatus 100 may determine the number of times that mobile device 206(1)-(3) have visited APs 202(1)-(N) within network 204 based at least in part on information 104. For example, apparatus 100 may determine that mobile device 206(1) has visited each of APs 202(1)-(4) four times within the last hour, each of APs 202(5)-(8) two times within the last hour, and each of APs 202(9)-(12) zero times within the last hour.

Continuing with this example, apparatus 100 may determine that mobile device 206(2) has visited each of APs 202(1)-(5) one time within the last hour, each of APs 202(6)-(8) four times within the last hour, and each of APs 202(9)-(12) one time within the last hour. Additionally or alternatively, apparatus 100 may determine that mobile device 206(3) has visited each of APs 202(1)-(6) zero times within the last hour, each of APs 202(7)-(9) three times within the last hour, and each of APs 202(10)-(12) five times within the last hour.

Apparatus 100 may then generate, for each of APs 202(1)-(12), scores that represent the probability that the AP in question will be the next AP visited by mobile devices 206(1)-(3). For example, apparatus 100 may generate a score of "75" for AP 202(4) with respect to mobile device 206(1). In this example, the score of "75" may represent the probability that AP 202(4) is the next AP visited by mobile device 206(1) while roaming within network 204.

As a similar example, apparatus 100 may generate a score of "30" for AP 202(4) with respect to mobile device 206(2). In this example, the score of "30" may represent the probability that AP 202(4) is the next AP visited by mobile device 206(2) while roaming within network 204. As another similar example, apparatus 100 may generate a score of "0" for AP 202(4) with respect to mobile device 206(3). In this example, the score of "0" may represent the probability that AP 202(4) is the next AP visited by mobile device 206(3) while roaming within network 204.

In this example, network 204 may maintain a threshold value of "60" for determining whether an AP is likely to be visited next by a mobile device. Accordingly, apparatus 100 may determine that the score of "75" for AP 202(4) with respect to mobile device 206(1) is above the threshold value of "60." In other words, mobile device 206(1) may be considered likely to visit AP 202(4) next while roaming within network 204. As a result, apparatus 100 may provide AP 202(4) with the roaming-session profile of mobile device 206(1) in anticipation of mobile device 206(1) potentially visiting AP 202(4) next.

Similarly, apparatus 100 may determine that the score of "30" for AP 202(4) with respect to mobile device 206(2) is below the threshold value of "60." In other words, mobile device 206(2) may be considered unlikely to visit AP 202(4) next while roaming within network 204. As a result, apparatus 100 may refrain from providing AP 202(4) with the roaming-session profile of mobile device 206(2) in an effort to avoid consuming unnecessary memory and/or processing power on AP 202(4).

Additionally or alternatively, apparatus 100 may determine that the score of "0" for AP 202(4) with respect to mobile device 206(3) is below the threshold value of "60." In other words, mobile device 206(3) may be considered unlikely to visit AP 202(4) next while roaming within network 204. As a result, apparatus 100 may refrain from providing AP 202(4) with the roaming-session profile of mobile device 206(3) in an effort to avoid consuming unnecessary memory and/or processing power on AP 202(4).

In some examples, storage-maintenance unit 210 may update information 104 as mobile devices 206(1)-(3) roam within network 204. For example, mobile device 206(1) may visit AP 202(4) while roaming within network 204. Once AP 202(4) assumes the roaming session of mobile device 206(1), AP 202(4) may send a notification indicating the same to apparatus 100.

As the notification arrives at apparatus 100, storage-maintenance unit 210 may receive the notification and then update information 104 to account for the recent visit of mobile device 206(1) to AP 202(4). For example, storage-maintenance unit 210 may reset and/or restart the aging timer for AP 202(4) with respect to mobile device 206(1). By resetting and/or restarting the aging timer in this way, storage-maintenance unit 210 may essentially reset and/or restart any decay and/or decrement applied to the corresponding score for AP 202(4).

In another example, mobile device 206(3) may visit AP 202(11) while roaming within network 204. Once AP 202(11) assumes the roaming session of mobile device 206(3), AP 202(11) may send a notification indicating the same to apparatus 100.

As the notification arrives at apparatus 100, storage-maintenance unit 210 may receive the notification and then update information 104 to account for the recent visit of mobile device 206(3) to AP 202(11). For example, storage-maintenance unit 210 may reset and/or restart the aging timer for AP 202(11) with respect to mobile device 206(3). By resetting and/or restarting the aging timer in this way, storage-maintenance unit 210 may essentially reset and/or restart any decay and/or decrement applied to the corresponding score for AP 202(11).

In a further example, storage-maintenance unit 210 may determine that mobile device 206(1) has not visited AP 202(9) within a certain amount of time. For example, storage-maintenance unit 210 may determine that mobile device 206(1) has not visited AP 202(9) within the last two hours based at least in part on the aging timer for AP 202(9). In response to this determination, storage-maintenance unit 210 may remove an entry corresponding to AP 202(9) from information 104 and/or the profile neighborhood for mobile device 206(1).

In some examples, the scores for APs 202(1)-(12) may decrease as the aging timers for APs 202(1)-(N) increase. For example, storage-maintenance unit 210 may configure information 104 such that the scores for AP 202(7) with respect to mobile devices 206(1)-(3) decrease as the aging timers for AP 202(7) with respect to mobile devices 206(1)-(3) increase. Additionally or alternatively, AP-prediction unit 106 may detect an increase in the amount of time since mobile device 206(2) last visited AP 202(7) based at least in part on the corresponding aging timer for AP 202(7). AP-prediction unit 106 may then decrement the score for AP 202(7) with respect to mobile device 206(2) to account for the increase in the amount of time since mobile device 206(2) last visited AP 202(7).

In some examples, AP-prediction unit 106 may generate the scores for APs 202(1)-(12) based at least in part on the roaming patterns of mobile devices 206(1)-(3). For example, AP-prediction unit 106 may generate a representation of a roaming pattern for mobile device 206(1) based at least in part on the number of times that mobile device 206(1) has visited APs 202(1)-(12). AP-prediction unit 106 may then generate and/or modify a score for each of APs 202(1)-(12) with respect to mobile device 206(1) based at least in part on the roaming pattern for mobile device 206(1).

In some examples, a mobile device may roam to an AP that is not included in the mobile device's profile neighborhood. For example, mobile device 206(1) may roam to AP 202(10) from AP 202(7) even though mobile device 206(1) had not visited AP 202(10) at all within the last hour. Since, in this example, AP 202(10) is not be included in the mobile device's profile neighborhood, AP 202(10) may not yet have access to the roaming-session profile of mobile device 206(1). As a result, AP 202(10) may request and obtain the roaming-session profile of mobile device 206(1) from AP 202(7), and AP-prediction unit 106 may add AP 202(10) to the profile neighborhood of mobile device 206(1).

Figure 6:
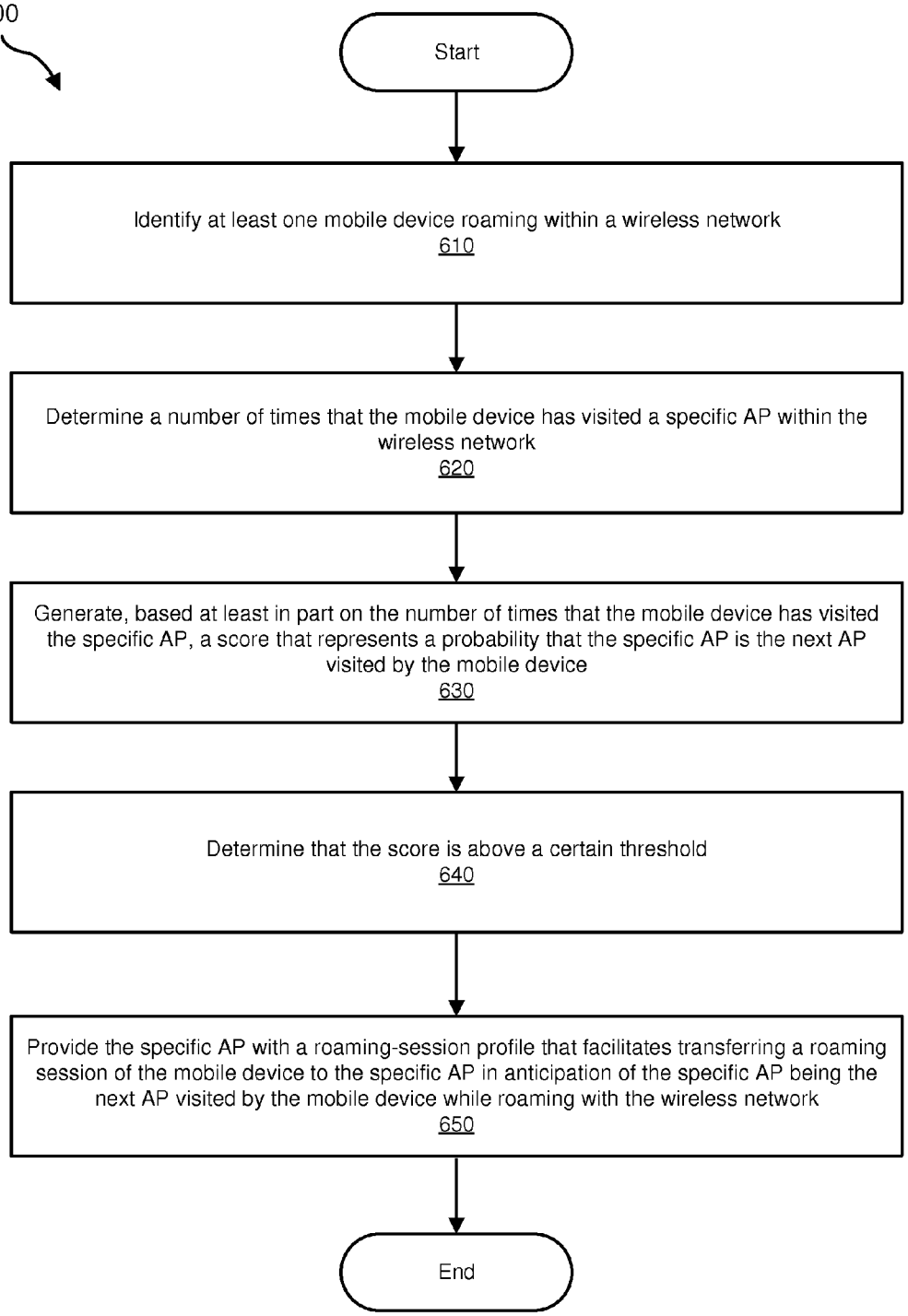
FIG. 6 is a flow diagram of an exemplary method for predicting roaming patterns of mobile devices within wireless networks.

FIG. 6 is a flow diagram of an exemplary method 600 for predicting roaming patterns of mobile devices within wireless networks. Method 600 may include the step of identifying at least one mobile device roaming within a wireless network (610). This identifying step may be performed in a variety of ways. For example, AP-prediction unit 106 may, as part of a wireless LAN controller or master AP, identify mobile device 206 roaming within network 204 by receiving a notification indicating that mobile device 206 is attempting to associate with one or more of APs 202(1)-(N). In another example, AP-prediction unit 106 may identify mobile device 206 roaming within network 204 by analyzing information 104 maintained in storage device 102.

Returning to FIG. 6, method 600 may also include the step of determining a number of times that the mobile device has visited a specific AP within the wireless network (620). This determining step may be performed in a variety of ways. For example, AP-prediction unit 106 may, as part of the wireless LAN or master AP, determine the number of times that mobile device 206 has visited AP 202(1) within network 204 by analyzing information 104 maintained in storage device 102. In this example, storage-maintenance unit 210 may, as part of the wireless LAN or master AP, update information 104 on an as-needed basis to ensure that information 104 reflects the current number of times that mobile device has visited AP 202(1).

Returning to FIG. 6, method 600 may additionally include the step of generating a score that represents a probability that the specific AP is the next AP visited by the mobile device based at least in part on the number of times that the mobile device has visited the specific AP (630). This generating step may be performed in a variety of ways. For example, AP-prediction unit 106 may, as part of the wireless LAN or master AP, generate a score that represents the probability that AP 202(1) will be the next AP visited by mobile device 206 based at least in part on the number of times that mobile device 206 has previously visited AP 202(1). In another example, AP-prediction unit 106 may configure information 104 to automatically generate and/or maintain such a score for AP 202(1) based at least in part on a mathematical formula that accounts for the number of times that mobile device 206 has previously visited AP 202(1).

Returning to FIG. 6, method 600 may further include the step of determining that the score is above a certain threshold (640). This determining step may be performed in a variety of ways. For example, AP-prediction unit 106 may, as part of the wireless LAN or master AP, compare the score that represents the probability that AP 202(1) will be the next AP visited by mobile device 206 with a certain threshold. AP-prediction unit 106 may then determine that the score is above the threshold based at least in part on this comparison.

Returning to FIG. 6, method 600 may finally include the step of providing the specific AP with a roaming-session profile that facilitates transferring a roaming session of the mobile device to the specific AP in anticipation of the specific AP being the next AP visited by the mobile device while roaming with the wireless network (650). This providing step may be performed in a variety of ways. For example, AP-prediction unit 106 may, as part of the wireless LAN or master AP, provide AP 202(1) with a roaming-session profile by directing the AP with which mobile device 206 is currently associated to send an instance of the roaming-session profile to AP 202(1). In another example, AP-prediction unit 106 may provide AP 202(1) with the roaming-session profile by sending an instance of the roaming-session profile to AP 202(1) from apparatus 100.

Figure 7:
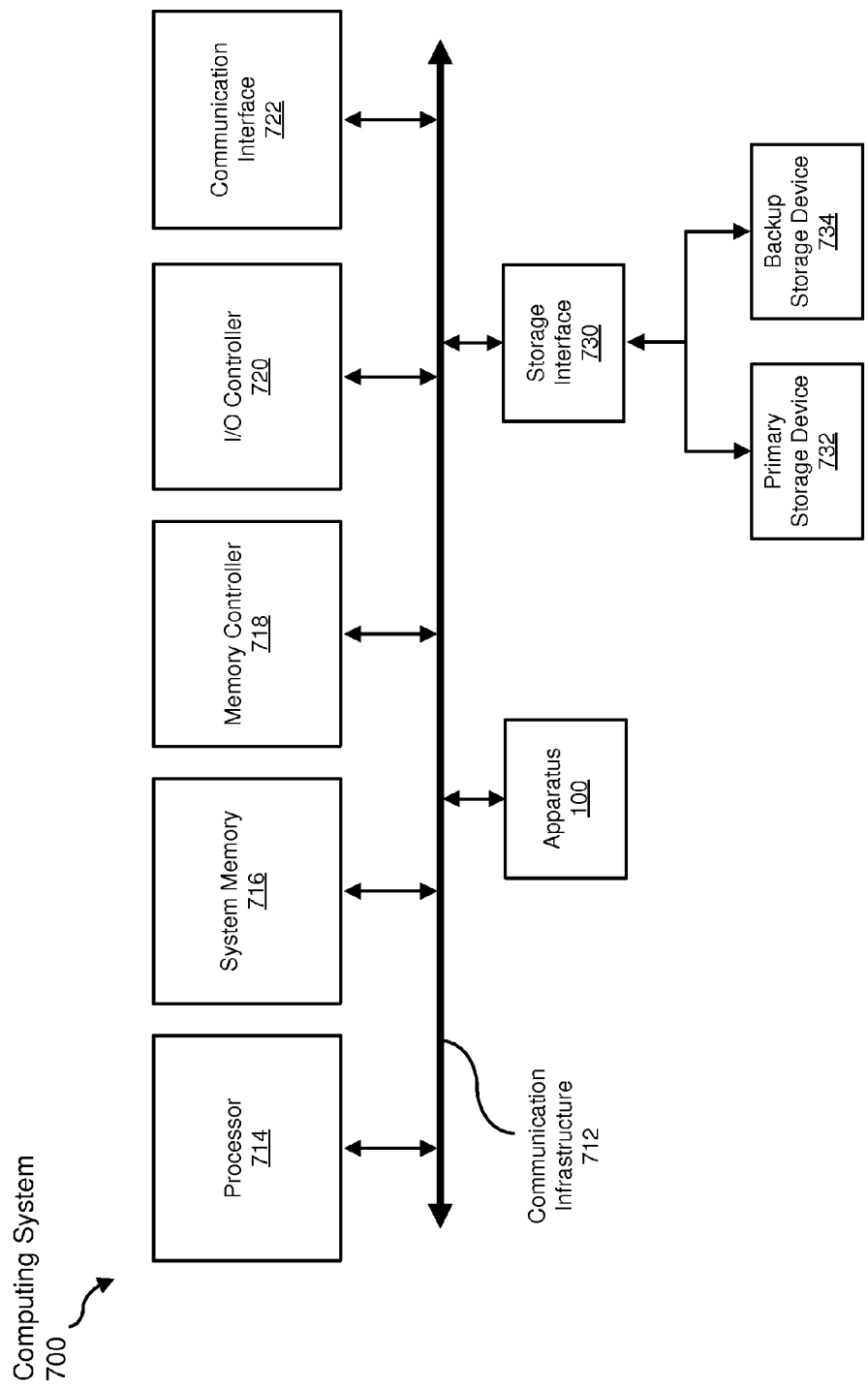
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 5. All or a portion of computing system 700 may also perform and/or be a means for performing and/or implementing any other steps, methods, or processes described and/or illustrated herein. In one example, computing system 700 may include apparatus 100 from FIG. 1.

Computing system 700 broadly represents any type or form of electrical load, including a single or multi-processor computing device or system capable of executing computer-readable instructions. Examples of computing system 700 include, without limitation, network devices (e.g., wireless WLAN controllers, master APs, etc.), workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7.

Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of apparatus 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive data to be transformed, transform the data into a score, output a result of the transformation to determine whether an AP is likely to be visited next by a mobile device, use the result of the transformation to predict a roaming pattern of the mobile device, and store the result of the transformation to determine which APs are to receive a roaming-session profile for the mobile device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a storage device that maintains information about mobile devices roaming within a wireless network;
    an Access Point (AP)-prediction unit communicatively coupled to the storage device, wherein the AP-prediction unit:
        identifies at least one of the mobile devices roaming within the wireless network;
        determines, based at least in part on the information maintained in the storage device, a number of times that the mobile device has visited a specific AP within the wireless network;
        generates, based at least in part on the number of times that the mobile device has visited the specific AP, a score that represents a probability that the specific AP is the next AP visited by the mobile device; and
        determines that the score is above a certain threshold;
    a profile-distribution unit that provides, in response to the determination that the score is above the certain threshold, the specific AP with a roaming-session profile that facilitates transferring a roaming session of the mobile device to the specific AP in anticipation of the specific AP being the next AP visited by the mobile device while roaming within the wireless network; and
    a storage-maintenance unit communicatively coupled to the storage device, wherein the storage-maintenance unit:
        constructs a table that includes the information about the mobile devices roaming within the wireless network;
        indexes the information included in the table by Media Access Control (MAC) addresses that each correspond to a different mobile device roaming within the wireless network;
        receives, from the specific AP, one or more notifications indicating that one or more of the mobile devices roaming within the wireless network have recently visited the specific AP; and
        updates the information included in the table based at least in part on the notifications received from the specific AP.

2. The apparatus of claim 1, wherein the storage-maintenance unit further:
    receives, from another AP within the wireless network, a notification indicating that the mobile device has recently visited the other AP; and
    updating the information included in the table based at least in part on the notification indicating that the mobile device has recently visited the other AP.

3. The apparatus of claim 1, wherein the information about the mobile devices comprises information that identifies a set of APs whose scores representing the probability of the mobile device visiting the APs next are above the certain threshold.

4. The apparatus of claim 3, wherein the information about the mobile devices further comprises information that identifies, for each individual AP within the set of APs:
    a MAC address of the individual AP;
    a number of times that the mobile device has visited the individual AP;
    a score that represents the probability that the individual AP is the next AP visited by the mobile device; and
    an aging timer that represents an amount of time since the mobile device last visited the individual AP.

5. The apparatus of claim 4, wherein the storage-maintenance unit:
    determines, based at least in part on the aging timer, that the mobile device has not visited the individual AP within a certain amount of time; and
    removes an entry corresponding to the individual AP from the information in response to determining that the mobile device has not visited the individual AP within the certain amount of time.

6. The apparatus of claim 4, wherein the AP-prediction unit:
    detects, based at least in part on the aging timer, an increase in the amount of time since the mobile device last visited the individual AP; and
    decrements the score that represents the probability that the individual AP is the next AP visited by the mobile device due at least in part to the increase in the amount of time since the mobile device last visited the individual AP.

7. The apparatus of claim 1, wherein the AP-prediction unit determines the number of times that the mobile device has visited the specific AP by determining a number of times that the mobile device has established a network connection through the specific AP.

8. The apparatus of claim 1, wherein the AP-prediction unit:
    determines the number of times that the mobile device has visited the specific AP by generating, based at least in part on the number of times that the mobile device has visited the specific AP, a representation of a roaming pattern of the mobile device within the wireless network; and
    generates, based at least in part on the representation of the roaming pattern of the mobile device, the score that represents the probability that the specific AP is the next AP visited by the mobile device.

9. A network device comprising:
    a hash table that includes information about mobile devices roaming within a wireless network;
    an Access Point (AP)-prediction unit that:
        identifies at least one of the mobile devices roaming within the wireless network;
        determines, based at least in part on the information included in the hash table, a number of times that the mobile device has visited a specific AP within the wireless network;
        generates, based at least in part on the number of times that the mobile device has visited the specific AP, a score that represents a probability that the specific AP is the next AP visited by the mobile device; and determines that the score is above a certain threshold;

a profile-distribution unit that provides, in response to the determination that the score is above the certain threshold, the specific AP with a roaming-session profile that facilitates transferring a roaming session of the mobile device to the specific AP in anticipation of the specific AP being the next AP visited by the mobile device while roaming within the wireless network; and a storage-maintenance unit with access to the hash table, wherein the storage-maintenance unit:

constructs the hash table that includes the information about the mobile devices roaming within the wireless network;

indexes the information included in the hash table by Media Access Control (MAC) addresses that each correspond to a different mobile device roaming within the wireless network;

receives, from the specific AP, one or more notifications indicating that one or more of the mobile devices roaming within the wireless network have recently visited the specific AP; and updates the information included in the table based at least in part on the notifications received from the specific AP.

10. The network device of claim 9, wherein the storage-maintenance unit further:

receives, from another AP within the wireless network, a notification indicating that the mobile device has recently visited the other AP; and updating the information included in the hash table based at least in part on the notification indicating that the mobile device has recently visited the other AP.

11. The network device of claim 9, wherein the information about the mobile devices comprises information that identifies a set of APs whose scores representing the probability that the specific AP is the next AP visited by the mobile device are above the certain threshold.

12. The network device of claim 11, wherein the information about the mobile devices further comprises information that identifies, for each individual AP within the set of APs:

a MAC address of the individual AP;

a number of times that the mobile device has visited the individual AP;

a score that represents the probability that the individual AP is the next AP visited by the mobile device; and an aging timer that represents an amount of time since the mobile device last visited the individual AP.

13. The network device of claim 12, wherein the storage-maintenance unit:

determines, based at least in part on the aging timer, that the mobile device has not visited the individual AP within a certain amount of time; and removes an entry corresponding to the individual AP from the information in response to determining that the mobile device has not visited the individual AP within the certain amount of time.

14. The network device of claim 12, wherein the AP-prediction unit:

detecting, based at least in part on the aging timer, an increase in the amount of time since the mobile device last visited the individual AP; and decrementing the score that represents the probability that the individual AP is the next AP visited by the mobile device due at least in part to the increase in the amount of time since the mobile device last visited the individual AP.

15. The network device of claim 9, wherein the AP-prediction unit determines the number of times that the mobile device has visited the specific AP by determining a number of times that the mobile device has established a network connection through the specific AP.

16. A method comprising:

identifying at least one mobile device roaming within a wireless network;

determining a number of times that the mobile device has visited a specific Access Point (AP) within the wireless network;

generating, based at least in part on the number of times that the mobile device has visited the specific AP, a score that represents a probability that the specific AP is the next AP visited by the mobile device;

determining that the score is above a certain threshold;

providing, in response to the determination that the score is above the certain threshold, the specific AP with a roaming-session profile that facilitates transferring a roaming session of the mobile device to the specific AP in anticipation of the specific AP being the next AP visited by the mobile device while roaming within the wireless network;

constructing a table that includes information about the mobile devices roaming within the wireless network;

indexing the information included in the table by Media Access Control (MAC) addresses that each correspond to a different mobile device roaming within the wireless network;

receiving, from the specific AP, one or more notifications indicating that one or more of the mobile devices roaming within the wireless network have recently visited the specific AP; and updating the information included in the table based at least in part on the notifications received from the specific AP.

* * * * *